(12) United States Patent
Schwaab et al.

(10) Patent No.: US 8,266,105 B2
(45) Date of Patent: Sep. 11, 2012

(54) SYSTEM FOR AUTOMATICALLY REPLICATING A CUSTOMER'S PERSONALIZED COMPUTER SYSTEM IMAGE ON A NEW COMPUTER SYSTEM

(75) Inventors: David Schwaab, Fort Collins, CO (US); Nathan Probst, Fort Collins, CO (US); Dennis B. Batchelor, Longmont, CO (US)

(73) Assignee: Rebit, Inc., Longmont, CO (US)

( * ) Notice: Subject to any disclaimer, the term of this patent is extended or adjusted under 35 U.S.C. 154(b) by 482 days.

(21) Appl. No.: 12/173,585

(22) Filed: Jul. 15, 2008

(65) Prior Publication Data

US 2008/0270493 A1 Oct. 30, 2008

Related U.S. Application Data

(63) Continuation-in-part of application No. 11/933,240, filed on Oct. 31, 2007, now Pat. No. 7,640,280.

(60) Provisional application No. 60/863,665, filed on Oct. 31, 2006.

(51) Int. Cl.
  *G06F 17/30* (2006.01)
  *G06F 12/00* (2006.01)
(52) U.S. Cl. ...................................................... 707/639
(58) Field of Classification Search ............... 707/104.1, 707/101, 102, 204, 10, 639
  See application file for complete search history.

(56) References Cited

U.S. PATENT DOCUMENTS

| | | | |
|---|---|---|---|
| 5,638,509 A | 6/1997 | Dunphy et al. | |
| 5,852,724 A | 12/1998 | Glenn, II et al. | |
| 5,864,853 A | 1/1999 | Kimura et al. | |
| 5,905,888 A | 5/1999 | Jones et al. | |
| 6,324,544 B1 * | 11/2001 | Alam et al. | ......................... 1/1 |
| 6,535,998 B1 | 3/2003 | Cabrera et al. | |
| 6,571,285 B1 | 5/2003 | Groath et al. | |
| 6,615,286 B1 | 9/2003 | Chobotaro et al. | |
| 6,704,873 B1 | 3/2004 | Underwood | |

(Continued)

FOREIGN PATENT DOCUMENTS

WO WO-2008055230 A2 5/2008

(Continued)

OTHER PUBLICATIONS

Young et al.; "The duality of memory and communication in the implementation of a multiprocessor operating system"; in Proceedings of the 11th ACM Symposium on Operating Systems Principles; Austin, Texas; pp. 63-76; published Nov. 1987.

(Continued)

*Primary Examiner* — Kuen Lu
(74) *Attorney, Agent, or Firm* — Patton Boggs LLP

(57) ABSTRACT

The Computer Image Replication System automatically replicates a customer's computer system image, including all of the customer's data, programs, device drivers, program preferences, personalizations, and file directory structures on a new computer system. The Computer Image Replication System is part of a Data Shadowing System which comprises a memory module that is connected to a monitored computer system via an existing communication medium, such as an input/output port, to store the shadowed data. The memory module includes a memory device for data storage, as well as software, including a control software component that is automatically installed on the monitored computer system when the memory module is first connected to the monitored computer system, as well as associated module software for maintaining a record of the data stored on the memory device and controlling the operation of the memory device.

24 Claims, 10 Drawing Sheets

U.S. PATENT DOCUMENTS

| | | | |
|---|---|---|---|
| 6,832,330 | B1 | 12/2004 | Boudrie et al. |
| 6,847,984 | B1 | 1/2005 | Midgley et al. |
| 6,889,249 | B2 | 5/2005 | Miloushev et al. |
| 7,240,060 | B2 | 7/2007 | Adya et al. |
| 7,328,225 | B1 | 2/2008 | Beloussov et al. |
| 7,640,280 | B2 | 12/2009 | Schwaab et al. |
| 7,685,175 | B2 | 3/2010 | Carroll et al. |
| 7,899,789 | B2 | 3/2011 | Schwaab et al. |
| 8,126,851 | B2 | 2/2012 | Schwaab et al. |
| 2003/0120822 | A1 | 6/2003 | Langrind et al. |
| 2003/0182325 | A1 | 9/2003 | Manley et al. |
| 2004/0243794 | A1* | 12/2004 | Mackin et al. ............ 713/1 |
| 2005/0005102 | A1* | 1/2005 | Meggitt et al. ............ 713/164 |
| 2005/0010918 | A1* | 1/2005 | Childs et al. ............ 717/174 |
| 2005/0027845 | A1 | 2/2005 | Secor et al. |
| 2005/0033718 | A1* | 2/2005 | Rettig et al. ............ 707/1 |
| 2005/0086241 | A1* | 4/2005 | Ram et al. ............ 707/100 |
| 2005/0216788 | A1 | 9/2005 | Mani-Meitav et al. |
| 2005/0283662 | A1 | 12/2005 | Li et al. |
| 2006/0015544 | A1 | 1/2006 | Kodama |
| 2006/0095659 | A1 | 5/2006 | New et al. |
| 2007/0038687 | A1 | 2/2007 | Carroll et al. |
| 2007/0136200 | A1 | 6/2007 | Frank et al. |
| 2007/0156793 | A1 | 7/2007 | D'Souza et al. |
| 2008/0046670 | A1 | 2/2008 | Lam |
| 2008/0104147 | A1 | 5/2008 | Schwaab et al. |
| 2010/0174684 | A1 | 7/2010 | Schwaab et al. |

FOREIGN PATENT DOCUMENTS

| | | | |
|---|---|---|---|
| WO | WO-2009059183 | A1 | 5/2009 |

OTHER PUBLICATIONS

International Search Report in co-pending PCT Application No. PCT/US2009/050759 dated Sep. 15, 2009.

In the US Patent and Trademark Office U.S. Appl. No. 11/933,197, Final Office Action dated Jun. 8, 2010, 19 pages.

In the US Patent and Trademark Office U.S. Appl. No. 11/933,197, Non-Final Office Action dated Feb. 23, 2010, 26 pages; and corresponding response dated Apr. 20, 2010, 11 pages, including Terminal Disclaimer.

In the US Patent and Trademark Office U.S. Appl. No. 11/933,240, Final Office Action dated May 1, 2009, 18 pages; and response dated Jul. 27, 2009, 19 pages, including Request for Continued Examination.

In the US Patent and Trademark Office U.S. Appl. No. 11/933,240, Non-Final Office Action dated Dec. 18, 2008, 15 pages; and response dated Mar. 18, 2009, 13 pages.

In the US Patent and Trademark Office U.S. Appl. No. 11/933,261 Non-Final Office Action dated Mar. 3, 2011, 11 pages.

In the US Patent and Trademark Office U.S. Appl. No. 12/725,315 Non-Final Office Action dated Oct. 17, 2011, 97 pages.

International Search Report in co-pending PCT Application No. PCT/US2007/083224 dated May 15, 2008.

International Search Report in co-pending PCT Application No. PCT/US2008/082055 dated Jan. 23, 2009.

In the US Patent and Trademark Office U.S. Appl. No. 12/725,315 Final Office Action dated Mar. 19, 2012, 38 pages.

* cited by examiner

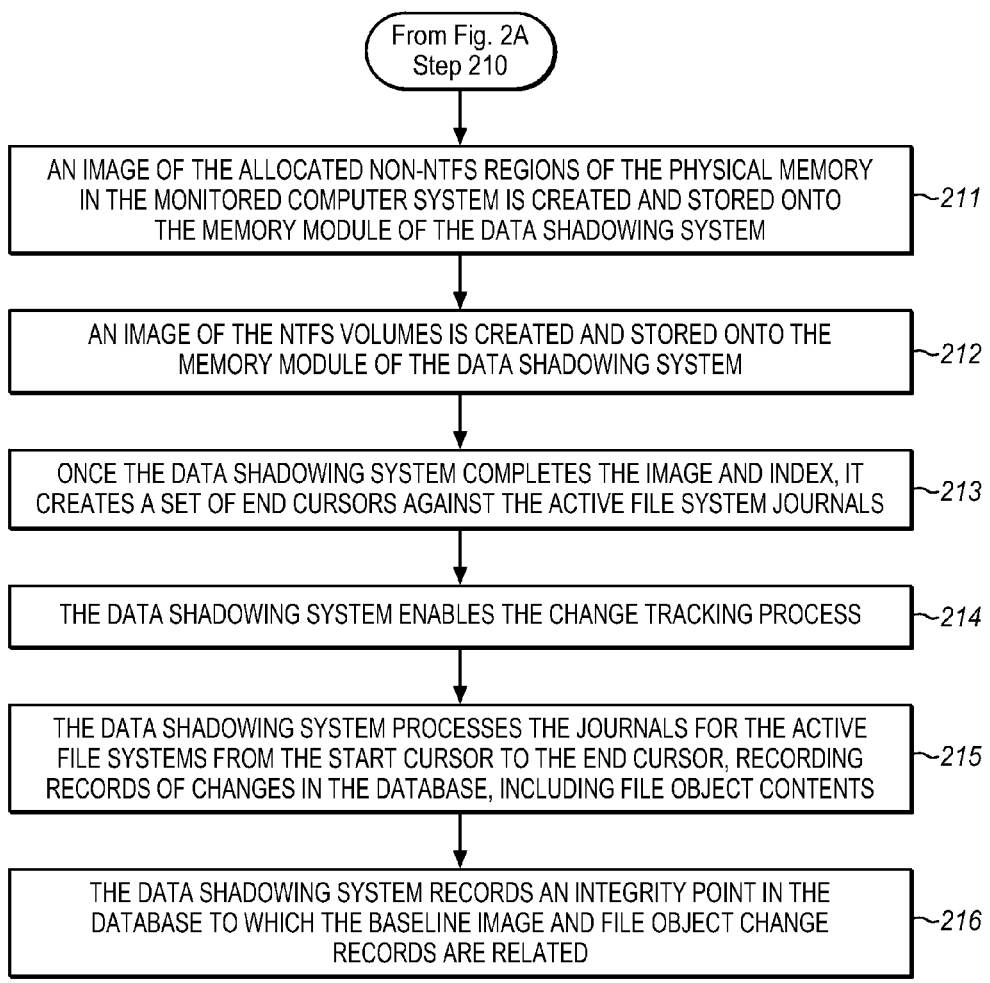

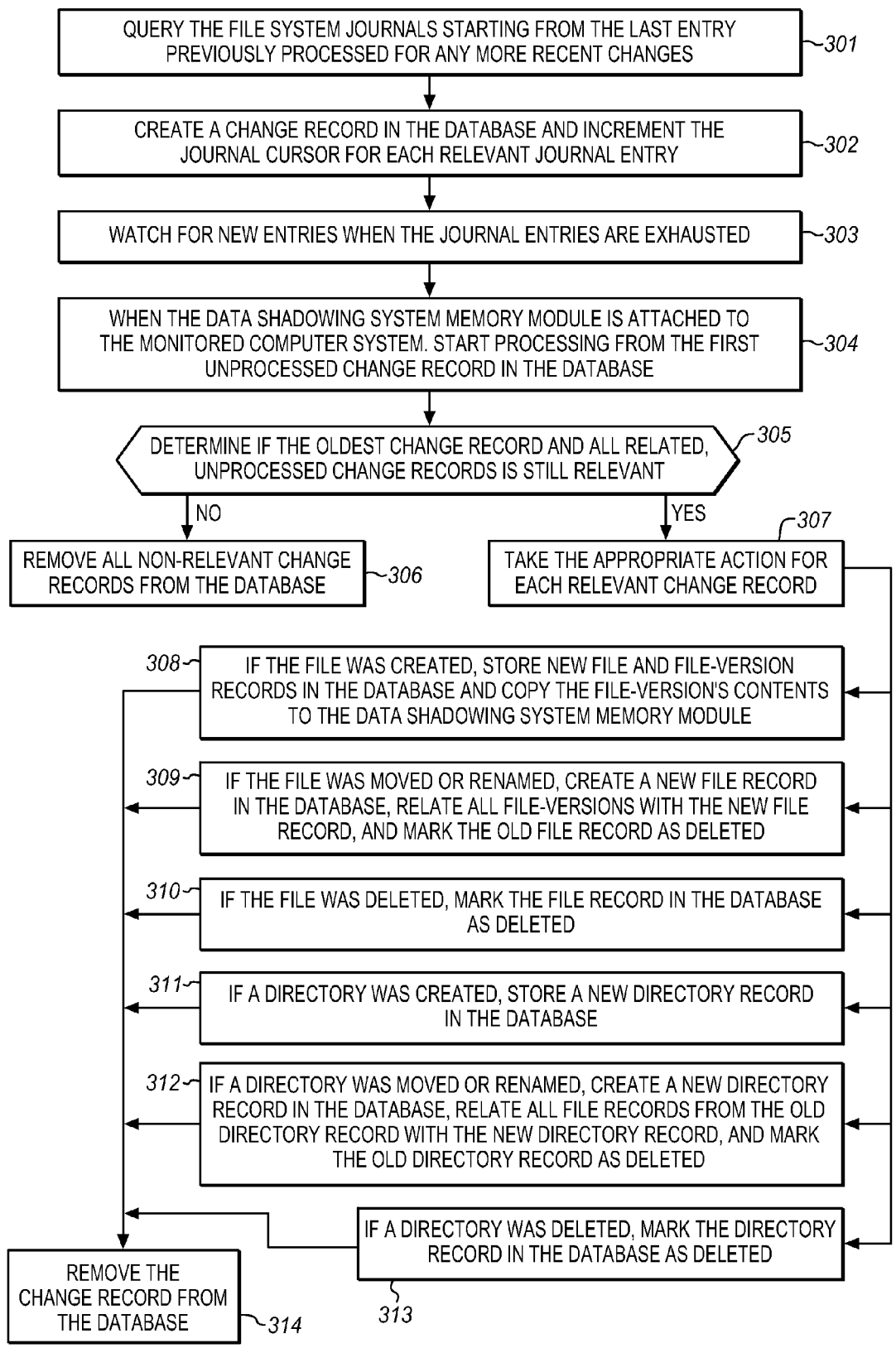

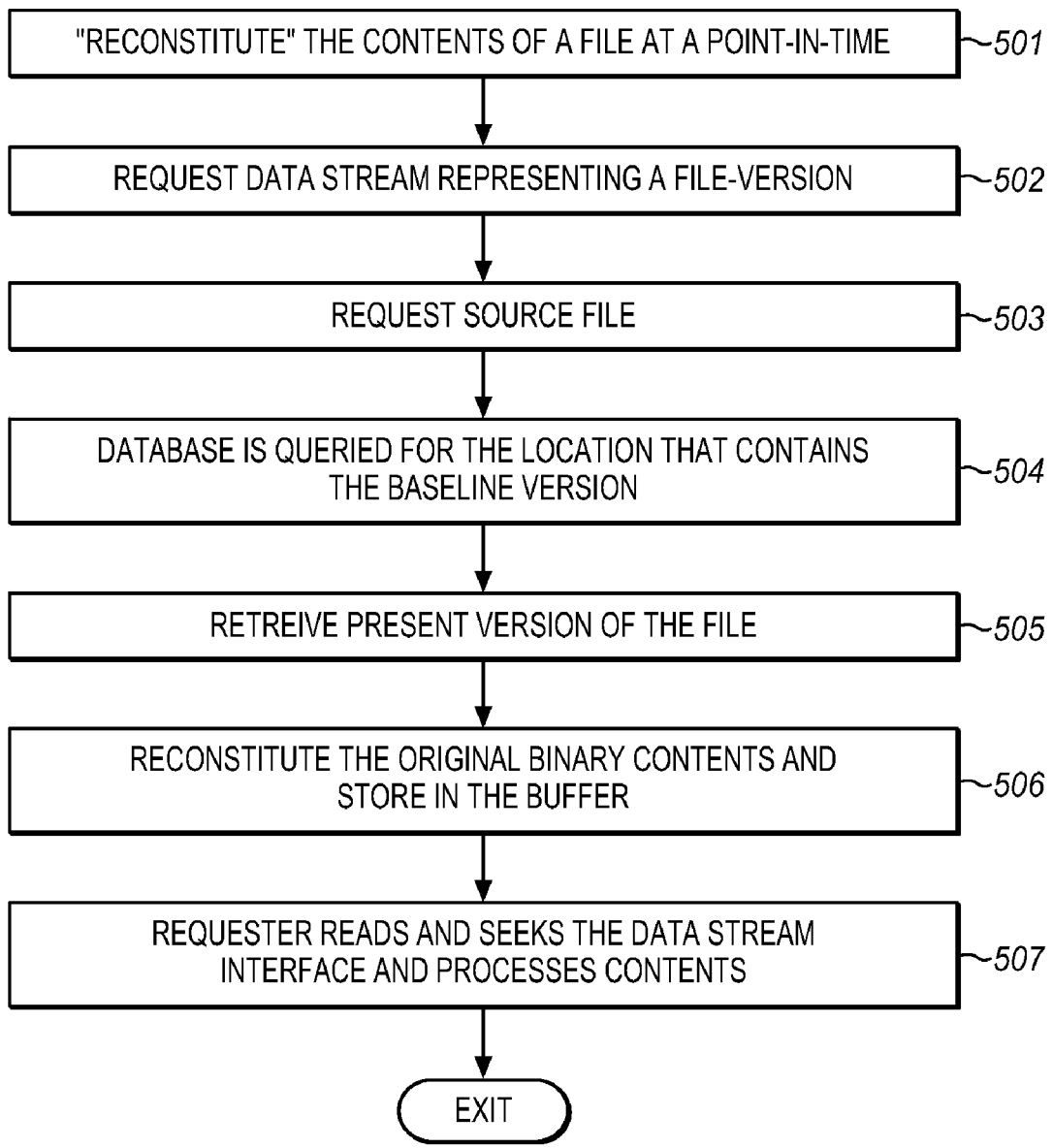

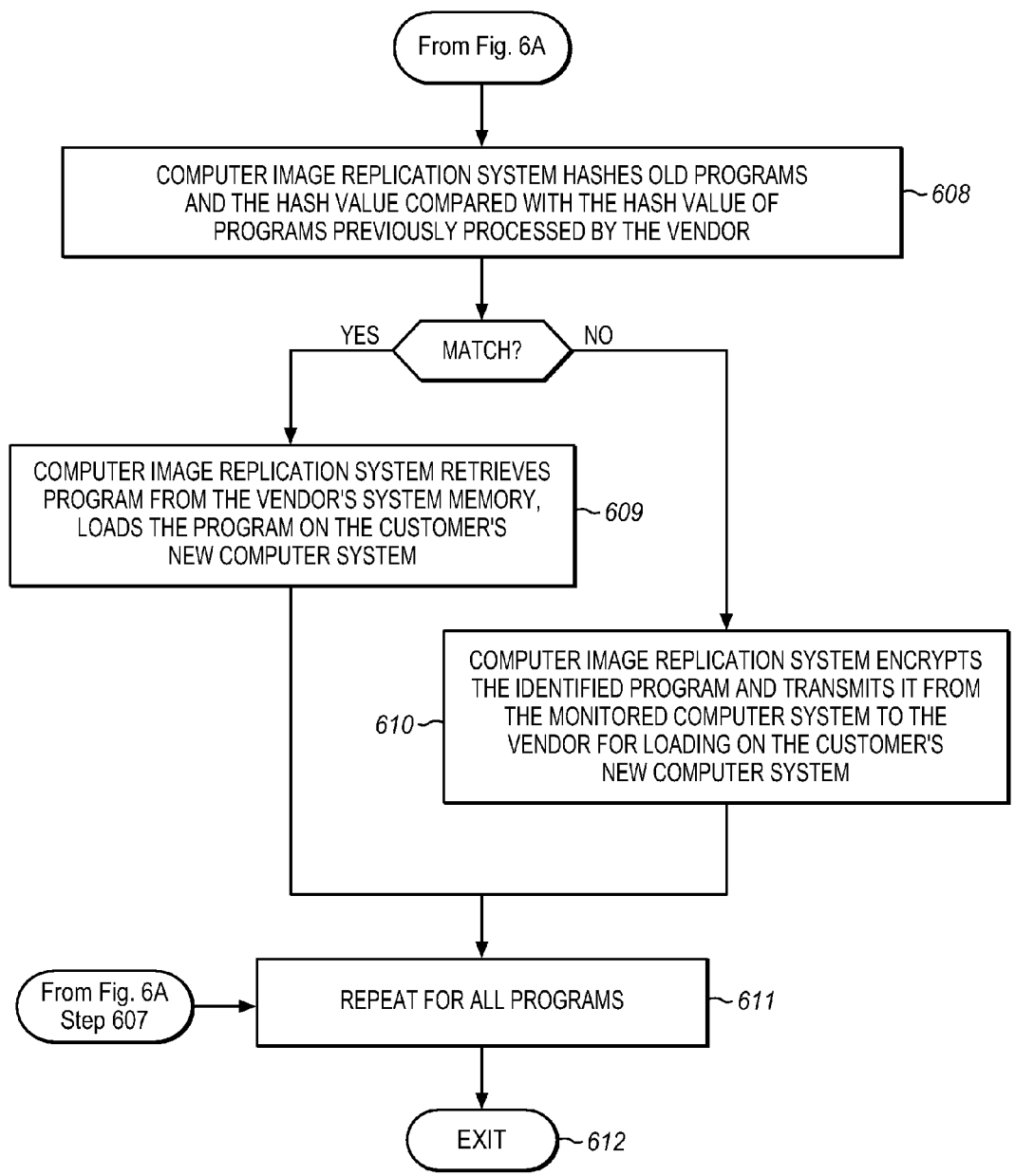

SYSTEM FOR AUTOMATICALLY REPLICATING A CUSTOMER'S PERSONALIZED COMPUTER SYSTEM IMAGE ON A NEW COMPUTER SYSTEM

CROSS-REFERENCE TO RELATED APPLICATIONS

This application is a Continuation-in-Part of U.S. patent application Ser. No. 11/933,240, titled "System For Automatically Shadowing Data And File Directory Structures That Are Recorded On A Computer Memory" filed on Oct. 31, 2007, which claims priority to U.S. Provisional Application No. 60/863,665, titled "Data Backup Systems And Methods" and filed on Oct. 31, 2006.

FIELD OF THE INVENTION

This invention relates to a system that is used to replicate a customer's computer system image, including all of the customer's data, programs, device drivers, program preferences, personalizations, and file directory structures on a new computer system.

BACKGROUND OF THE INVENTION

When a customer purchases a new computer system, it is a problem to populate the customer's new computer system with all of the contents of the customer's prior computer system and to ensure that the customer's personalizations of the programs and interfaces are not lost in the transfer. Typically, the customer purchases a new computer system and orders a suite of programs from the vendor, which programs are loaded on the new computer system at the vendor's distribution site. The new computer system then is delivered to the customer, who must then load all of the customer data, device drivers, program preferences, personalizations, and file directory structures, as well as other programs that were not purchased from the vendor but were resident on the customer's old computer system.

Loading the old programs requires that the customer locate the original program disks that were received when the old program was purchased, load the contents of these disks on to the new computer system, then update these programs to the latest version, typically via a connection to the program distributor's WEB site on the Internet. In addition, all of the customer files must be transferred from the memory of the old computer system to the new computer system, typically by transferring these files from the old computer to a rewritable media, such as a portable memory device, and loading the contents of the portable memory device on to the customer's new computer system. This process is repeated numerous times until the contents of the memory of the customer's old computer system are transferred to the new computer system. Furthermore, the customer must manually select the device drivers, program preferences, personalizations, and file directory structures that were in effect on the customer's old computer system. This process is laborious, time consuming, subject to errors in missing customer files, and subject to difficulties encountered in relocating old program files to the new computer system.

Some computer systems make use of attached data backup systems to store a copy of the data that is stored in the computer memory and updates thereto for eventual retrieval to restore data that is lost from or corrupted in the computer system memory. However, the use of these existing data backup systems is laborious and can be confusing to the casual customer. Thus, the use of these data backup systems can reduce the complexity of the customer file transfer to the new computer system; however, compatability problems may be encountered which renders this process ineffective.

In addition, existing data backup systems (including both hardware and software) fail to ensure that the customer can simply plug in to the computer system to "back-up" the data stored therein, and also enable recovery of a revision of a file from a point-in-time, and enable all of the hard disk(s) in the computer system to be restored to a point-in-time. Existing data backup systems fail to efficiently track and store the state of multiple file systems over time, while allowing for correct disk-level and file-level restoration, to a point-in-time, without storing a significant amount of redundant data. These data backup systems require the customer to learn new technology, understand the file system of the computer system, learn how to schedule data backup sessions, and learn new controls that must be used for this new functionality. Furthermore, the restoration of lost files is difficult using these data backup systems.

Thus, there is presently no system which can populate a customer's new computer system with all of the contents of the customer's prior computer system and can ensure that the customer's data, programs, device drivers, program preferences, personalizations, and file directory structures are not lost in the transfer.

BRIEF SUMMARY OF THE INVENTION

The above-described problems are solved and a technical advance achieved by the present System For Automatically Replicating A Customer's Personalized Computer System Image On A New Computer System (termed "Computer Image Replication System" herein) which automatically replicates a customer's computer system image, including all of the customer's data, programs, device drivers, program preferences, personalizations, and file directory structures on a new computer system. The Computer Image Replication System can include or be connected to a Data Shadowing System which comprises a memory module that is connected to the customer's old computer system (termed "monitored computer system" herein) via an existing communication medium, such as an input/output port to store the shadowed data. The memory module includes a memory device for data storage, as well as software, including a control software component that is automatically installed on the monitored computer system when the memory module is first connected to the monitored computer system, as well as associated module software for maintaining a record of the data stored on the memory device and controlling the operation of the memory device.

The Computer Image Replication System functions to automatically replicate the customer's monitored computer system image, including all of the customer's data, programs, device drivers, program preferences, personalizations, and file directory structures on a new computer system. The Computer Image Replication System is operated by the vendor or distributor (collectively termed "vendor" herein) of the new computer system and makes use of the data stored in the memory device located in the memory module of the Data Shadowing System which is connected to the monitored computer system to automatically populate the customer's new computer system with all of the contents of the customer's prior computer system and to ensure that the customer's personalizations of the programs and interfaces are not lost in the transfer. Thus, the Computer Image Replication System makes the transition from an old computer system to a new computer system effortless and ensures that nothing is lost in the migration to the new computer system.

The Data Shadowing System automatically stores the data which is retrieved from the memory of the monitored computer system onto the memory device located in the memory module in a single format, while representing it in a data management database in two formats: disk sectors and files. The Data Shadowing System thereby efficiently tracks and stores the state of multiple file systems over time, while allowing for correct disk-level and file-level restoration, to a point-in-time, without storing redundant data.

The Data Shadowing System operates autonomously, freeing the customer from needing to interact with the Data Shadowing System to have the memory of the monitored computer system backed up. The backup is nearly always up to date, so long as the Data Shadowing System is connected to the monitored computer system. The Data Shadowing System incorporates database technology to optimize the data storage and retrieval for normal operations, and the database of file directory information itself resides on the monitored computer system hard drive, while a backup copy of the database is written periodically to the Data Shadowing System.

In addition, the file changes, creations, relocations, and deletions are tracked through time, with the Data Shadowing System enabling point-in-time restoration of individual files as well as file systems. The full system restore capability enables the reconstruction of the entire memory of the monitored computer system, including: operating system, applications, and data files for a given point in time without requiring the intervention of the customer. If the Data Shadowing System memory module is disconnected from the monitored computer system for any length of time, the control software component that executes on the monitored computer system tracks the appropriate file changes occurring through time and then performs normal backup activities once the Data Shadowing System memory module is reconnected to the monitored computer system.

BRIEF DESCRIPTION OF THE DRAWINGS

FIGS. 2A and 2B illustrate, in flow diagram form, the operation of the Data Shadowing System during the initial installation of the Data Shadowing System on a monitored computer system;

FIG. 3 illustrates, in flowchart form, the operation of the Data Shadowing System to store a copy of the data that is presently added to the monitored computer system's memory;

FIG. 5 illustrates, in flow diagram form, the operation of the Data Shadowing System to retrieve data stored therein for restoration of a file in the memory of the monitored computer system.

DETAILED DESCRIPTION OF THE INVENTION

Definitions

The following terms as used herein have the following meanings.

"File system"—the system utilized by the computer operating system to organize, store, and access information contained in the computer system memory.

"File navigation system"—the textual, hierarchical navigation interface used by the computer operating system to provide a customer with an organized manner of storing, identifying, locating, and operating on files for customer operations contained in the computer system memory.

"Change journal"—a computer operating system provided to identify and track any file changes, creations, deletions, or relocations.

"Meta file"—an indirect means for storing information about a related file (e.g., file size and creation date for a data file).

"Page file"—a computer operating system defined and created file which is specific to the present session running on the computer system; the page file represents short-lived data that is not valid or meaningful to a subsequent session and, therefore, is of no value to retain.

"Integrity Point"—a collection of files and file references which exist at a particular time to represent the files that were current and valid for that time; restoration of an integrity point ensures that files are consistent and meaningful to the computer operating system and applications that may require multiple files to be self-consistent.

"File Reference Number" or FRN—a unique identifier for a given file or folder entry in the file system file table.

"NTFS"—Acronym associated with the file system for a computer operating system. The file system provides an important feature known as journaling, which creates a queue of file changes, creations, deletions, or relocations.

Computer Image Replication System

Figure 1A:
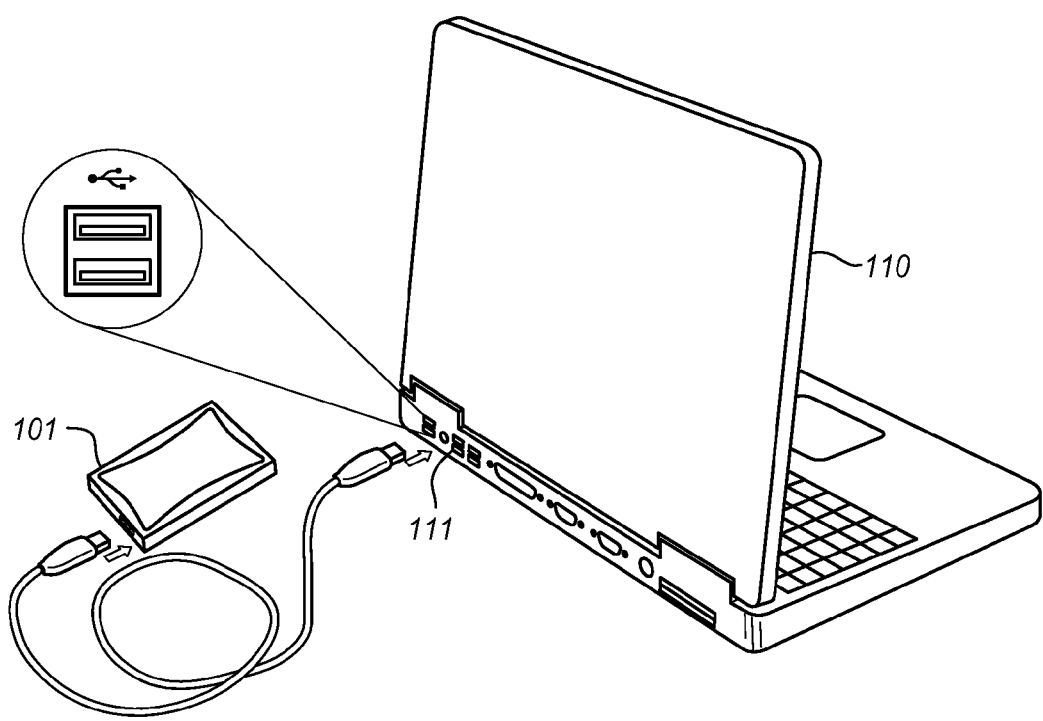
FIG. 1A illustrates a perspective view of a typical computer system that is connected to the Data Shadowing System.
Figure 1B:
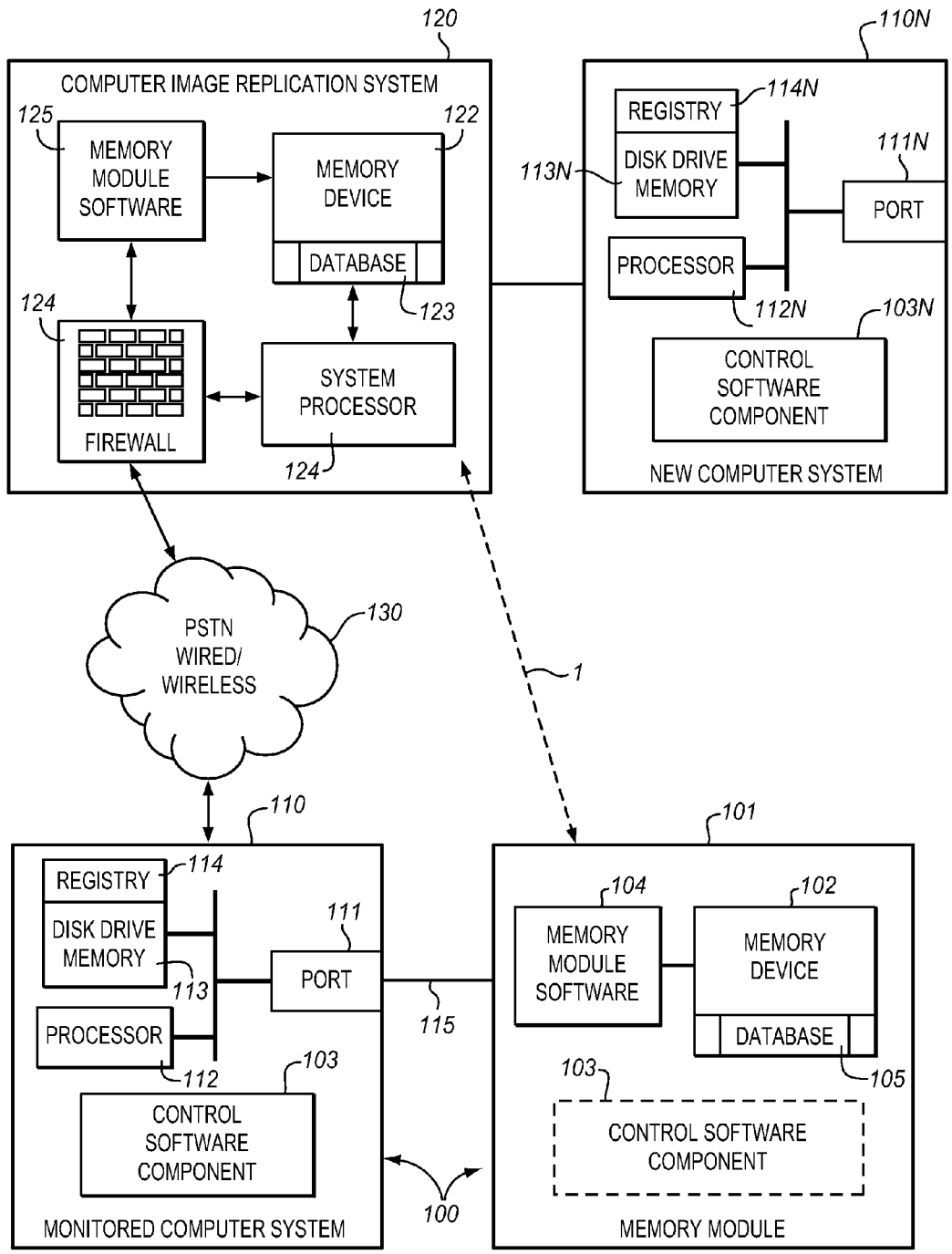
FIG. 1B illustrates the basic architecture of the Computer Image Replication System, including a Data Shadowing System which is installed at the customer's monitored computer system.

FIG. 1A illustrates a perspective view of a typical computer system that is equipped with the Data Shadowing System 100, and FIG. 1B illustrates the basic architecture of the present Computer Image Replication System 120, including a Data Shadowing System 100 which is installed at the customer's monitored computer system 110 (this relationship is shown by the dotted line 1 on FIG. 1B). The Computer Image Replication System 120 is installed at and operated by the vendor or distributor of the new computer system 110N and makes use of the data stored in the memory device 102 located in the memory module of the Data Shadowing System 100, which is connected to the monitored computer system 110 to automatically populate the customer's new computer system 110N with all of the contents of the customer's prior computer system 110 and to ensure that the customer's personalizations of the programs and interfaces are not lost in the transfer. Thus, the Computer Image Replication System 120 makes the transition from an old computer system 110 to a new computer system 110N effortless and ensures that nothing is lost in the migration to the new computer system 110N.

The Computer Image Replication System 120 typically is connected to the customer's monitored computer system 110 via a communication connection through a communication medium 130, such as the Internet, or the Public Switched Data Network, or Public Switched Telephone Network. The Computer Image Replication System 120 includes a database 123 and associated memory 122 for storing programs, files, and other data. A Firewall 121 interconnects the Computer Image Replication System 120 with the communication medium 130, and memory module software 125 is optionally included in the Computer Image Replication System 120. A system processor 124 manages the operation of the Computer Image Replication System 120 and executes the process steps illustrated in FIG. 6.

The customer's new computer system 110N is connected to the Computer Image Replication System 120 and contains a processor 112N, disk drive memory 113N, and registry 114N. The new computer system 110N is also equipped with a port 111N. For the purpose of this description, it is assumed that the new computer system 110N is devoid of programs or customer data and must have its memory populated with the programs purchased by the customer, as well as the legacy programs and customer data that is resident on the monitored computer system 110. It is also assumed that the monitored computer system 110 has been connected to a Data Shadowing System 100, and the contents of disk drive memory 113 are stored on memory device 102 in the Data Shadowing System 100.

Data Shadowing System Architecture

The monitored computer system 110 typically includes a processor 112, memory 113 (such as a disk drive, although any form of read/write memory can be used, and the term "memory" is used herein to describe this element), and a data communication medium 115, such as an input/output port 111, or wireless interface and the like. The Data Shadowing System 100 comprises a memory module 101 that is connected to the computer system 110 via an existing data communication medium 115, such as input/output port 111 and its associated cable to store the shadowed data. For the sake of example, the data communication medium illustrated herein is the existing standard USB port 111, which provides both a data communication path as well as a source of power for the memory module 101. However, any data communication medium can be used, whether wired or wireless, and whether capable of supplying power to the memory module 101 or not. The memory module 101 includes a memory device 102 and its associated memory module software 104 and database 105 for managing the data storage. The Data Shadowing System 100 also includes a control software component 103 that is automatically installed on the monitored computer system 110 when the memory module 101 is first connected to the monitored computer system 110.

The simplicity and ease of use of the Data Shadowing System 100 requires minimal customer interaction, and the "Autorun" feature of the USB connection 111 can be used, for example, to support an automatic installation of the Data Shadowing System software component 103. Thus, upon the first connection of the memory module 101 of the Data Shadowing System 100 to the monitored computer system 110, the Data Shadowing System 100 calls the "Autorun" software resident on the operating system of the monitored computer system 110 to initiate the installation application portion of the control software component 103 which is stored on the memory module 101 of the Data Shadowing System 100. (Alternatively, a mountable media can be used to initiate installation of the control software component 103 from the monitored computer system 110.) The installation application then identifies that this is an initial installation of the Data Shadowing System 100 with the monitored computer system 110. The memory module software 104 requests system information from the operating system of the monitored computer system 110 and stores this system information in a database 105. This system information subsequently is used to determine if the Data Shadowing System 100 has been previously connected to monitored computer system 110. If the Data Shadowing System 100 has already been installed, the monitored computer system 110 activates memory module 101 and starts talking to it. Power for the memory module 101 can be obtained from the data communication medium, or an internal or external power source can be used as a function of the installation of the memory module 101 and the data communication medium 115 used.

Operation of the Computer Image Replication System

Figure 6A:
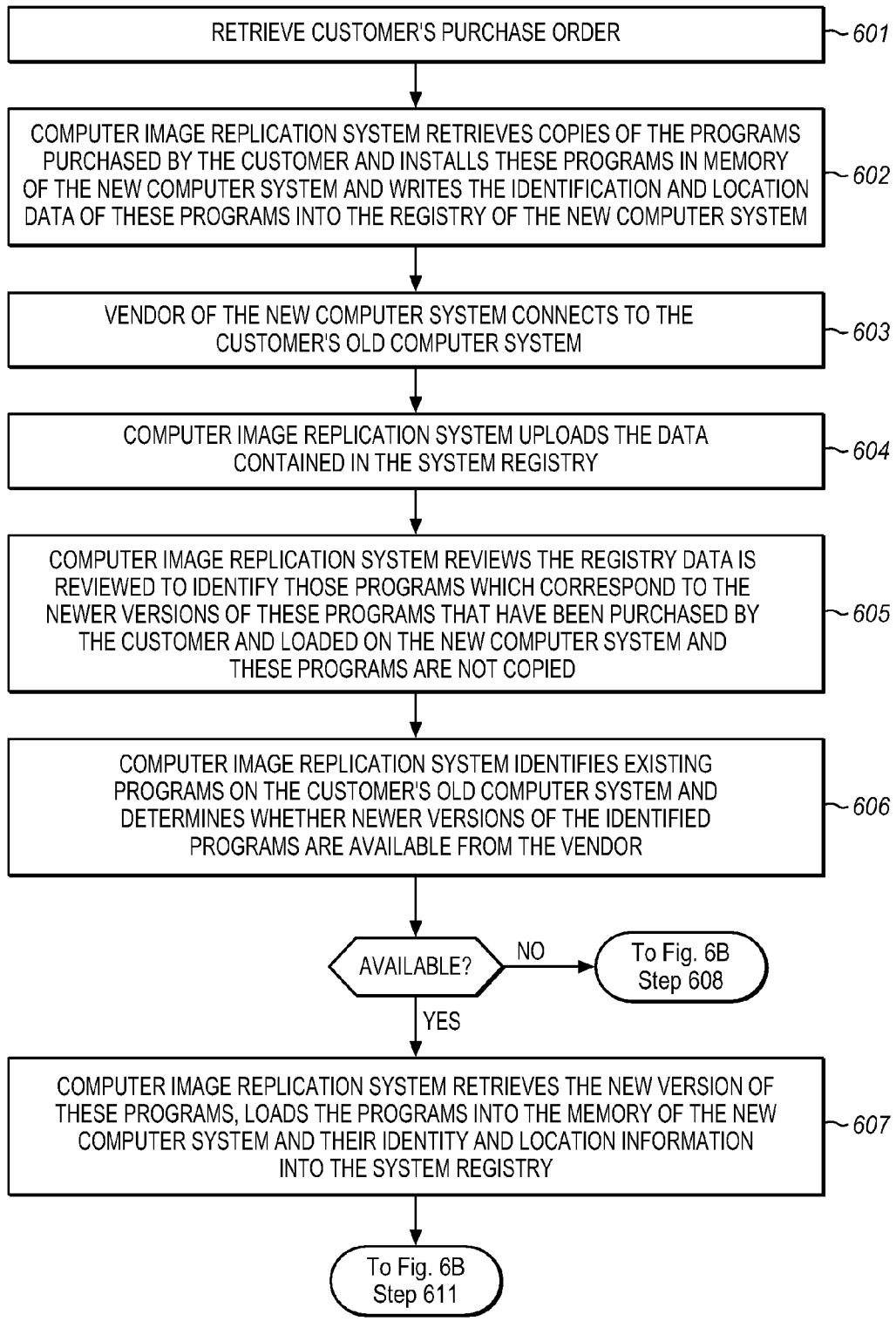
FIGS. 6 and 7 illustrate, in flow diagram form, the operation of the present Computer Image Replication System to retrieve programs and data, respectively, stored in the Data Shadowing System for restoration of the entirety of the memory of the monitored computer system on to a new computer system.
Figure 7:
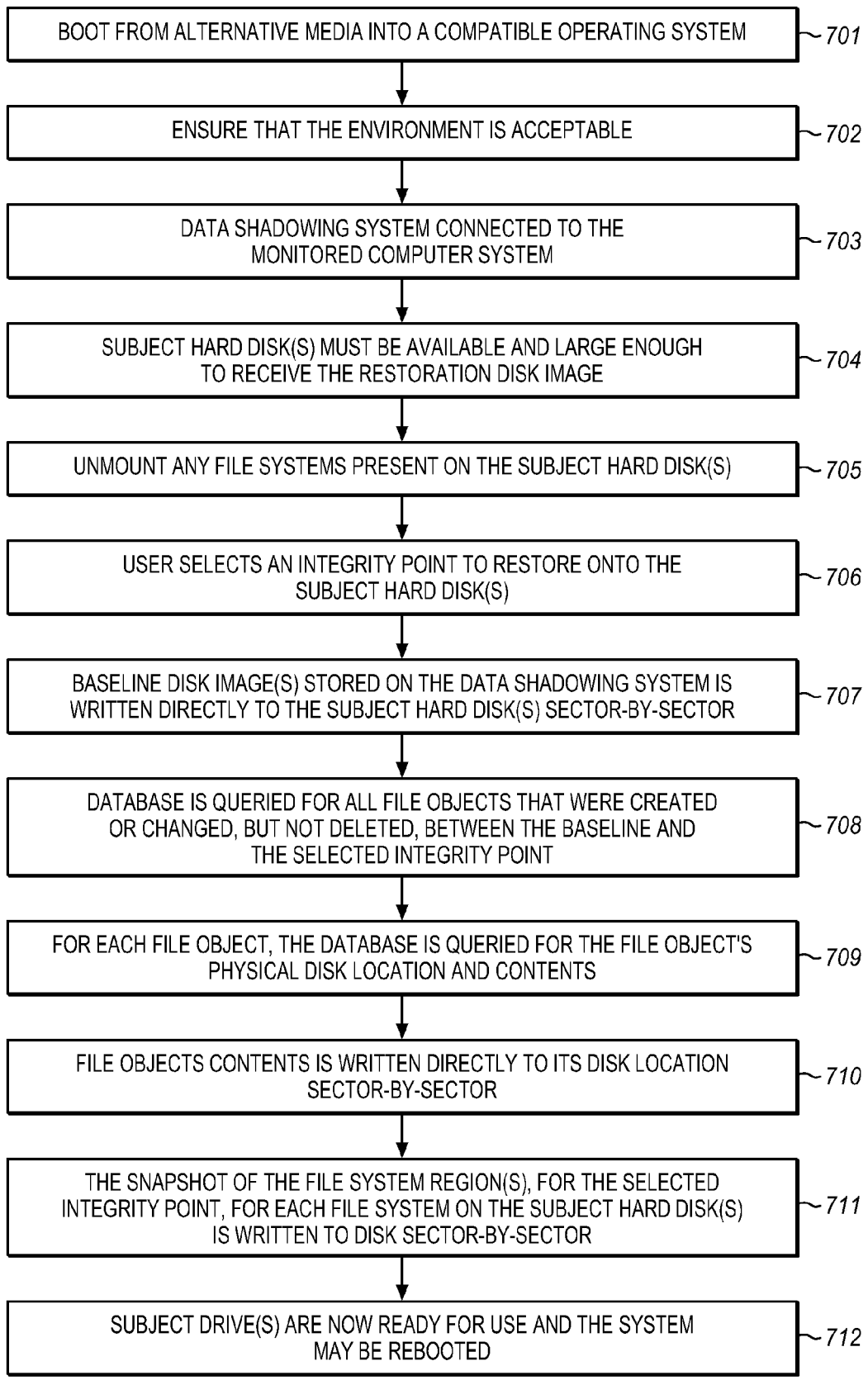

FIGS. 6 and 7 illustrate, in flow diagram form, the operation of the present Computer Image Replication System 120 to populate the customer's new computer system 110N with programs, and to also retrieve programs and data stored in the memory device 102 located in the memory module 101 of the Data Shadowing System 100, to automatically populate the customer's new computer system 110N with all of the contents of the customer's prior computer system 110, and to ensure that the customer's personalizations of the programs and interfaces are not lost in the transfer. This is the operation required to restore the complete state of a physical disk 113 of the monitored computer system 110 at a point-in-time on the customer's new computer system 110N. The available points-in-time are defined by previously stored Integrity Points. The goal of the Computer Image Replication System 120 is to "reconstitute" a self-consistent image of the subject physical disk 113 to the sector level and write this to a hard disk 113 on the customer's new computer system 110N, as well as to link to the native operating system resident on the customer's new computer system 110N. In order to make the access to files on the customer's new computer system 110N as seamless as the access on the monitored computer system 110, the file explorer system of the customer's new computer system 110N is utilized. By registering with, and making calls to, the file explorer system, the display of the contents of the Data Shadowing System 100 mimics the display of the contents of the customer's old computer system 110.

At step 601, the customer's purchase order that was submitted to the vendor is retrieved and the new computer system 110N is connected to the Computer Image Replication System 120. The new computer system 110N typically is devoid of programs and customer files, but may be equipped with the basic operating system. The programs stored on a computer system are identified and located by the use of the system registry, such as the Windows Registry 114. Thus, when a customer purchases a new computer system 110N, the programs installed on the old system 110 can be identified by reviewing the contents of the customer's old system's Registry 114. As part of the purchase of the new computer system 110N, the customer specifies software (programs) that are to be installed on the new computer system 110N. Master copies of this software typically reside in memory 122 located at the vendor's site, and the vendor is authorized by the software manufacturer to issue licenses to this software to purchasers and to also install copies of this software on their new computer systems 110N. Therefore, at step 602, the Computer Image Replication System 120 retrieves copies from memory 122 of the programs purchased by the customer and installs these programs in memory 113N of the new computer system 110N, and writes the identification and location data of these programs into the registry 114N of the new computer system 110N.

The contents of the monitored computer system 110 then is accessed and uploaded to the new computer system 110N. This is done by the vendor of the new computer system 110N connecting to the customer's old computer system 110 at step 603, typically via a communication connection, and uploading the data contained in the system Registry 114 at step 604. The registry data is reviewed by the Computer Image Replication System 120 at step 605 to identify those programs which correspond to the newer versions of these programs that have been purchased by the customer and loaded on the new computer system 110N. These programs are not copied, since they are already loaded into memory 113N. Existing programs on the customer's old computer system 110 are identified at step 606, and their version is checked to determine whether newer versions are available from the vendor. If so, the new version of these programs are retrieved from the program files 122 of the vendor at step 607, loaded into the memory 113N of the new computer system 110N, and their identity and location information are written into the System Registry 114N. If not, or if these programs are not part of the suite of programs maintained by the vendor, the old programs at step 608 are each hashed and the hash value compared with the hash value of programs previously processed by the vendor. If there is a match with another previously retrieved program, that program is retrieved from the vendor's system memory 122 and loaded on the customer's new computer system 110N at step 609. If not, the identified program is encrypted at step 610 and transmitted from the monitored computer system 110 to the vendor for loading on the customer's new computer system 110N. This process is repeated until it is determined at step 611 that all programs have been migrated, then processing exits at step 612 to the data file transfer process of FIG. 7.

The Computer Image Replication System 120, once the programs both old and new) have been loaded into memory 113N of the new computer system 110N, proceeds to load the customer's file system from the monitored computer system 110 to the new computer system 110N. In the following description, it is assumed that the customer's monitored computer system 110 has been equipped with a Data Shadowing System 100, which has stored copies of the file system from the monitored computer system 110. Alternatively, the Computer Image Replication System 120 can be equipped with the software elements that comprise the Data Shadowing System 100 and execute the entire initialization process as is described below. For this reason, the Computer Image Replication System 120 is shown in FIG. 1A as being equipped with the memory module software 125. Regardless of which of these two scenarios is the case, the Computer Image Replication System 120 proceeds to trim out Operating System files stored in memory 113 of the monitored computer system 110 from the file transfer process, encrypts, and loads the encrypted file system from the monitored computer system 110 on to the new computer system 110N, as is described below. The customer can then decrypt the file system to ensure the integrity and privacy of the files contained in the file system as this process is implemented.

File Transfer Process

In order to write to the physical system disk, it is necessary to boot the customer's new computer system 110N from an alternative media and ensure that the file systems on that disk are not in use at step 701. At step 702, the Data Shadowing System 100 is connected to the monitored computer system 110; and at step 703, the monitored computer system 110 is connected to the Computer Image Replication System 120. At step 704, the hard disk(s) in the new computer system 110N are checked to ensure that they are large enough to receive the restoration disk image. The subject hard disk does not need to be formatted, but can be formatted if desired. At step 705, any file systems present on the subject hard disk(s) 113N are unmounted and the customer selects an Integrity Point to restore onto the subject hard disk(s) 113N at step 706.

The baseline non-FTS disk image(s) stored on the Data Shadowing System 100 is written directly to the subject hard disk(s) 113N sector-by-sector at step 707. The database 115 is queried at step 708 for the snapshot corresponding to the closest file system image to the selected baseline. At step 709, the snapshot is written to the subject hard disk(s) 113N and, for each file object, the database 115 is queried at step 710 for the file object's storage location. The file object's contents are written directly to its disk location at step 711. The subject drive(s) 113N are now ready for use, and the customer's new computer system 110N may be rebooted at step 712.

The Data Shadowing System 100 makes note of distinguishing features of the monitored computer system 110 such that the connection of the Data Shadowing System memory module 101 to the customer's new computer system is quickly identified. The Data Shadowing System "Autorun" initialization application asks the customer if they want access to the files stored within the Data Shadowing System memory module 101 or if they wish to re-initialize the Data Shadowing System 100 to pair with the newly connected computer system. If the customer wishes to re-initialize with the customer's new computer system, all backup data from the previous monitored computer system 110 is eliminated, and a message indicating the same is displayed. If the customer wishes to access files contained on the memory module 101, the Data Shadowing System 100 initializes a limited application permitting the customer to utilize the same graphical customer interface as before. The customer may then locate and drag-and-drop files onto the newly connected computer system hard disk drive.

Initialization of the Data Shadowing System

Figure 2A:
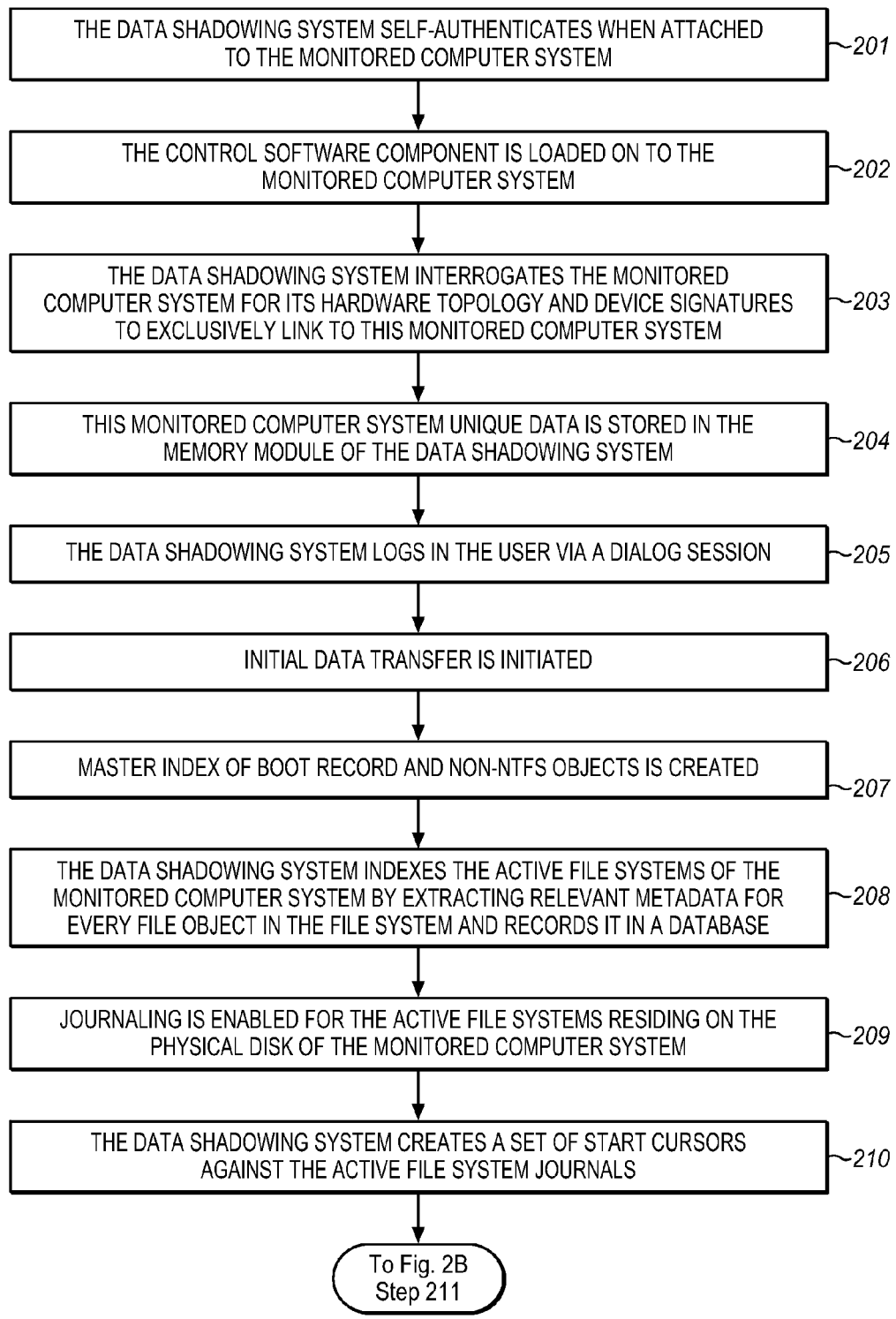

FIGS. 2A and 2B illustrate, in flow diagram form, the operation of the Data Shadowing System 100 during the initial installation of the Data Shadowing System 100 on a monitored computer system 110, where the Data Shadowing System 100 is linked exclusively to this monitored computer system 110, and an initial shadow copy of the contents of the monitored computer system's memory is created in the memory module 101 of the Data Shadowing System 100. This process also applies to the use of the memory module software 125 in the Computer Image Replication System 120 where the monitored computer system 110 has not previously been served by the Data Shadowing System 100.

The Data Shadowing System 100 in this example is powered by the monitored computer system 110 via the data communication medium 115 as noted above, and optionally self-authenticates at step 201 when it is first attached to the monitored computer system 110 by ensuring that the serial number encoded into the memory device 102 of the Data Shadowing System memory module 101 matches the serial number entry inserted into the control software component 103. During manufacturing, the serial number is queried from the memory device 102, inserted into the control software component 103, and stored onto the Data Shadowing System 100 in a manner to circumvent unauthorized replication of the Data Shadowing System 100 software onto additional memory devices.

The Data Shadowing System 100 then begins installation and initialization of the Data Shadowing System 100 for the monitored computer system 110 at step 202. In place of the traditional software installation process whereby the customer is required to insert a mountable media into a selected drive of the monitored computer system 110 in order to install software, the Data Shadowing System 100 can utilize the simple "Autorun" feature of the USB standard of port 111. The control software component 103 of the Data Shadowing System 100 is loaded onto the monitored computer system 110 at step 202; and at step 203, the monitored computer system 110 is interrogated by the control software component 103 of the Data Shadowing System 100 to obtain data which defines the hardware topology and device signatures of the monitored computer system 110. This signature information is used to "pair" the Data Shadowing System 100 to the monitored computer system 110 and is stored in memory module software 104 at step 204.

The Data Shadowing System 100 displays a simple dialog box to the customer at step 205 via the display screen of the monitored computer system 110 to indicate that they agree to the Data Shadowing System 100 customer license agreement. This simplified customer agreement dialog is required to ensure that the customer is agreeable with the terms set forth in the end customer license agreement. If the customer did not intend to install the Data Shadowing System 100, or is dissatisfied with the end customer license agreement, nothing remains on the monitored computer system 110 pertaining to the Data Shadowing System 100.

Upon successful installation of the Data Shadowing System 100, the customer is not required to take further action to ensure the protection and backup of the data that is presently stored and subsequently added, deleted, or modified on the memory 113 of the monitored computer system 110. The customer is required to leave the memory module 101 of the Data Shadowing System 100 attached to the monitored computer system 110 for an initial period of time in order to have an initial valid backup of their data files and directory structures from the monitored computer system 110 to the memory module 101 of the Data Shadowing System 100 at step 206, but attaching the memory module 101 of the Data Shadowing System 100 is the only action step required of the customer. The control software component 103 concurrently monitors the ongoing memory activity of the monitored computer system 110, while the initial data backup is being executed without requiring the modification of the monitored computer system 110 or the use of complex interconnection processes.

The Data Shadowing System 100 efficiently stores the data retrieved from the memory 113 of the monitored computer system 110 in a single format, while representing it internally in two formats: disk sectors and files. The Data Shadowing System 100 also efficiently tracks and stores the state of multiple file systems that are resident on the monitored computer system 110 over time, while allowing for correct disk-level and file-level restoration to a point-in-time without storing redundant data. A Meta File System may be implemented in the Data Shadowing System 100 to describe the state of each active file system and the underlying physical disk or disks at a point-in-time with integrity. The Meta File System is an internally consistent, related-in-time collection of critical data and metadata from the file systems and physical disks under its protection. The Meta File System may collect certain data, and do so in a way that correctness is ensured.

Typical Meta File System data that is collected may include:
- A baseline image of the non-FTS sectors which are formatted on each physical disk installed in the monitored computer system 110.
- A complete indexing of the file systems contained on each physical disk for a designated point-in-time. This index includes the mapping of file objects to their location on the physical disk.
- A serialized journal of file system changes over time.
- Copies of the file object contents resulting from file system changes over time.
- Multiple self-consistent "snapshots" of the on-disk metadata for each active file system at a point-in-time.

The challenge of creating a consistent-in-time view of multiple active file systems is met by combining the collected data into a single database and organizing and accessing it via data management algorithms resident in the Data Shadowing System 100.

Memory Indexing

The first step in this initial data transfer process is to generate a master index of all contents of the monitored computer system's memory 113 at step 206. The monitored computer system 110 discovers each storage device (memory 113) on the monitored computer system 110 and creates a corresponding Object Model for each Storage Device (TRStorageDevice). The Storage Device objects are children of the monitored computer system 110. While they all share some base level attributes, they can specialize for different aspects of the physical device.

For each TRStorageDevice, monitored computer system 110 identifies all of the unique disk regions that it contains and creates an object model for each (TRDiskRegion). While all TRDiskRegions share some basic traits, they specialize themselves according to the type of Region they describe. For instance, examples of unique disk regions include the Master Boot Record (MBR), the partition table, a file system region (NTFS or FAT32 partition), a hidden OEM recovery partition, and seemingly unused "slices" that are the leftovers between formal partitions. Data Shadowing System 100 identifies and accounts for every single sector on a physical storage device and creates an appropriate TRDiskRegion object to manage and index them.

TRDiskRegions that do not have a recognizable file system are treated as "Block Regions." Block Regions comprise a span of disk sectors (start, from sector zero, and length), and are simply archived as a block range onto the Data Shadowing System 100 memory device 102.

This master index includes processing the master boot record and file system at step 207 to generate an index of every partition, file, and folder on the monitored computer system 110; and this index data for each partition, file, and folder is entered into a database 114 residing on the monitored computer system memory 113 as well as optionally a database 105 in the memory module 101.

The master boot record contains information about the arrangement of data on the monitored computer system memory 113. These contents may be arranged with subsets of data such that there is a primary, bootable partition and alternate, non-bootable partitions. An entry in the master boot record determines the status of these partitions, as well as size and binary offset values for each partition. Capturing and processing this information permits the Data Shadowing System 100 to automatically reconstruct the entire contents of the monitored computer system memory 113. The database exists largely to facilitate a (faster) way to search and retrieve file history and revisioning. The method used to lay down the "copy/backup" of the file system of the monitored computer system 110 enables recreation of the data contained in the database 114 from the Data Shadowing System 100 itself. In the case of Data Shadowing System 100, most of the Object Models that model a feature or attribute of the monitored computer system 110 are persisted to the Data Shadowing System 100 memory module 101 as file system streams in a directory structure that matches or emulates the physical hierarchy from where they came from.

After processing the master boot record, the file system for the primary bootable partition is processed at step 208 to record each file and folder entry, placing records into the database 114 residing on the monitored computer system memory 113. This database contains information about each file and folder and is accessed primarily during file retrieval requests; and it also is updated with changes to individual files and folders to create a chronological record of changes. This same database 114 is mirrored (database 105) onto the Data Shadowing System memory module 101 whenever the memory module 101 is connected to the monitored computer system 110. The mirrored database 105 is used primarily during full-system restoration where the monitored computer system memory 113 may have failed, and the mirrored database 105 contains records of each file and folder residing in the binary data copied to the Data Shadowing System memory device 102. TRDiskRegions that do have a recognized file system create an Object Model for the file system "Volume" (TRVolume). A Volume understands the concepts and navigation of its contained file system and the concept of its associated mount point.

Memory Copy

Upon completion of processing the master boot record and file system, the Data Shadowing System 100 begins the second step of this process by copying the binary information from the monitored computer system memory 113, with the exception of a subset of the memory 113. The exception subset consists of: areas not allocated or identified as in use by any of the partitions, as well as areas identified as temporary information by the operating system. An example of the temporary information is the operating system page file, which is useful only during the current session and is meaningless to a subsequent session.

The copy process identifies a Data Shadowing System 100 storage device, and writes the non-NTFS file objects onto the Data Shadowing System 100 memory device 102 at step 211. Once all of these objects are written into memory device 102, the Data Shadowing System 100 writes all of the NTFS files onto memory device 102 at step 212 in a directory hierarchy that mimics their physical and logical relationships on the monitored computer system 110. Below is a simple base directory tree of a Data Shadowing System 100 (depth of the contained file systems has been omitted):

R:\data\REBITDV05\072CE3A9
R:\data\REBITDV05\19F418B5
R:\data\REBITDV05\647931C9
R:\data\REBITDV05\647931D6
R:\data\REBITDV05\072CE3A9\Region0
R:\data\REBITDV05\072CE3A9\Region1
R:\data\REBITDV05\072CE3A9\Region2
R:\data\REBITDV05\072CE3A9\Region1\{ddffc3ed-7035-11dc-9485-000c29fddfb0}
R:\data\REBITDV05\072CE3A9\Region2\{ddffc3f3-7035-11dc-9485-000c29fddfb0}
R:\data\REBITDV05\19F418B5\Region0
R:\data\REBITDV05\19F418B5\Region1
R:\data\REBITDV05\19F418B5\Region1\{732534f9-cb5a-11db-befe-806e6f6e6963}
R:\data\REBITDV05\647931C9\Region0
R:\data\REBITDV05\647931C9\Region1
R:\data\REBITDV05\647931C9\Region1\{a93586cc-cb5f-11db-b097-000c29e897d0}
R:\data\REBITDV05\647931D6\Region0
R:\data\REBITDV05\647931D6\Region1
R:\data\REBITDV05\647931D6\Region2
R:\data\REBITDV05\647931D6\Region1\{a93586d2-cb5f-11db-b097-000c29e897d0}

To understand this, know that the Data Shadowing System 100 storage device 103 was mounted on drive "R", and all archiving operations are going to directory "data". The next indicia in this string is the name of the monitored computer system 110 that provided the content "REBITDEV05", then the physical disk signature (i.e., 072CE3A9, 072CE3A9, etc.). If the disk drive has data that is to be archived, it is then organized into Region objects that are simply sequentially numbered Region0, Region1, etc.). If a region contains an understood file system/volume, its volume identifier is used in the persistent storage to map its path. In the case of R:\data\REBITDV05\072CE3A9\Region1\{ddffc3ed-7035-11dc-9485-000c29fddfb0}, on this system, it happens that this is an NTFS volume, and a full mirror of the file system for drive "C:" of the monitored computer system 110.

A key point here is that the Object Models for each element of the monitored computer system 110 are themselves stored in file system streams on the Data Shadowing System 100 memory device 102. For example, the TRMachine object is "saved" as a hidden stream inside of the R:\data\REBITDV05\ directory entry, and the volume object for R:\data\REBITDV05\072CE3A9\Region1\{ddffc3ed-7035-11dc-9485-000c29fddfb0} is saved as a hidden stream on that directory entry.

What this means is, from the Data Shadowing System 100 file system alone, all of the object relationships and their metadata can be reconstructed with no database. Further, when a file eventually is archived to the Data Shadowing System 100, all of its associated history and metadata are stored as hidden streams in the file entry itself. The database 114 can be completely reconstructed from the Data Shadowing System 100 storage file system itself.

In addition, in the Data Shadowing System 100 storage architecture, the files are not actually stored with the name they had on the monitored computer system 110. Rather, they are stored with a file name that is a unique hash value of the contents of that file. A file system "soft link" then is used in the directory structure above to point to the data of the hash value named "blob" of data that is the file from the monitored computer system 110. The customer only sees the soft link. Data Shadowing System 100 stores the hashed value named file. If any two files hash to the same value (meaning they are binary identical), only one copy needs to be hosted in storage; and the symbolic links for both host copies point to the same stored content. This attribute of functionality is the first level of intrinsic data de-duplication.

To continue, when a file is modified on the monitored computer system 110, the new data is hashed, named, and stored on the monitored computer system 110; and the old version of the file is removed and replaced with only a description of its binary differences to the new version Reverse X-Delta). This strategy allows for Data Shadowing System 100 to keep pristine copies of all current files, while being able to regenerate previous versions at all times and minimizing data storage space requirements on the Data Shadowing System 100 itself.

Because of the time required to read the memory 113 of the monitored computer system 110, and because it contains an active file system, the Data Shadowing System 100 enables Journaling at step 209 for the active file systems residing on the physical disk being imaged. In addition, the Data Shadowing System 100 at step 210 sets the flag in the database indicating an Integrity Point is desired by creating a set of cursors against the active file system journals, which set of cursors are termed the "Start Cursors". The Journal process begins identifying and queuing files to act upon. Once the cursors are created, the Data Shadowing System 100 at step 211 creates and compresses an image of the active file systems into the memory device 101 of the memory module 101 of the Data Shadowing System 100. To save memory space, the active file systems are queried for their allocated regions of the physical disk, and only allocated regions are read and compressed.

At step 212, the Data Shadowing System 100 indexes the active file systems to extract relevant metadata for every file object in the file system and records it in a database. The Data Shadowing System 100 identifies and indexes all directories contained within the file navigation system by File Reference Number, or FRN, and identifies and inserts entries into the database for each cluster run representing the file. The Data Shadowing System 100 initializes the baseline by inserting entries in the database signifying completion of the initialization. Once the image and index are complete, the Data Shadowing System 100 at step 213 creates a second set of cursors against the active file system journals termed the "Most Recent Entries".

At step 214, the Data Shadowing System 100 enables Change Tracking; and at step 215, the journals for the active file systems are processed from the Start Cursor to the Most Recent Entry to record records of changes in the database including file object contents. Upon reaching a point-in-time where no files remain in the queue to process, the appropriate actions are taken to insert an Integrity Point entry into the database.

Finally, at step 216, the Data Shadowing System 100 records an Integrity Point in the database to which the baseline image and file object change records are related. This is the data required to allow a self-consistent Disk Recovery at the point-in-time which the Integrity Point represents. Thus, the full disk copy and the file changes, creations, deletions, or relocations that occurred during the full disk copy are collected into a set to represent a fully restorable point called the "Integrity Point".

Change Tracking

FIG. 3 illustrates, in flowchart form, the operation of the present Data Shadowing System 100 to store a copy of data that are newly added to the monitored computer system's memory. The Data Shadowing System 100 process registers with the operating system change journal in order to receive notification of changes occurring to files and folders residing on the monitored computer system memory 113. The change journal then dynamically notifies the Data Shadowing System 100 of changes, permitting the Data Shadowing System 100 to determine the appropriate action to take. File creation, movement, content changes, and renaming are all events requiring action; and each action is entered into an action queue for processing.

The Data Shadowing System action queue is utilized for periods where the Data Shadowing System memory module 101 is attached or detached from the monitored computer system 110. If the memory module 101 is attached to the monitored computer system 110, the Data Shadowing System 100 processes each action queue entry, updating the entry in the database 114, and, if necessary, compressing and transferring the file binary contents to the Data Shadowing System memory module 101.

During periods of time that the Data Shadowing System memory module 101 is detached, the action queue is utilized for recording actions that are to be performed once the memory module 101 is attached to the monitored computer system 110. This recording process permits the Data Shadowing System 100 to prioritize the actions to be performed, selecting the files of highest importance to be processed before lower priority files. This is the continuous process of maintaining the data required to assemble a consistent-in-time view of the file systems. The process of change tracking begins immediately after the Initialization and Indexing is complete, as described above.

Journal Processing

Journal processing is continuous and occurs whether or not the Data Shadowing System memory module 101 is attached to the monitored computer system 110. The control software component 103 of the Data Shadowing System 100 at step 301 queries the file system journals for any more recent changes, starting from the last entry previously processed. The control software component 103 at step 302 then creates a change record in the action queue in database 114 and increments the journal cursor for each relevant journal entry. For each relevant journal entry, the control software component 103 creates a change record in the action queue in database 114 and increments the journal cursor. When the journal entries are exhausted (up-to-date), the control software component 103 watches for new entries.

Data Synchronization

Data Synchronization is intermittent and occurs only when the Data Shadowing System memory module 101 is attached to the monitored computer system 110. When the memory module 101 is attached to the monitored computer system 110, the control software component 103 starts processing at step 304 from the first unprocessed change record in the action queue in database 114. For the oldest change record and all related unprocessed change records, the control software component 103 at step 305 determines if each is still relevant (for example, if the file was created and is already deleted, it is not relevant). The control software component 103 at step 306 removes all non-relevant change records from the action queue in database 114. Alternatively, at step 307, the control software component 103 takes the appropriate action for each relevant change record. If the file was created, the control software component 103 stores new file and file-version records in the action queue in database 114 and copies the file-version's contents to the Data Shadowing System memory module 101 at step 308. If the file was moved or renamed, the control software component 103 creates a new file record in the action queue in database 114, relates all file-versions from the old file record with the new file record, and marks the old file record as deleted at step 309. If the file was deleted, the control software component 103 marks the file record in the action queue in database 114 as deleted at step 310. If a directory was created, the control software component 103 stores a new directory record in the action queue in database 114. If a directory was moved or renamed, the control software component 103 creates a new directory record in the action queue in database 114, relates all file records from the old directory record with the new directory record, and marks the old directory record as deleted at step 312. If a directory was deleted, the control software component 103 marks the directory record in the action queue in database 114 as deleted at step 313. Finally, at step 314, the control software component 103 removes the change record from the action queue in database 114, and processing returns to step 305.

Create an Integrity Point

Figure 4:
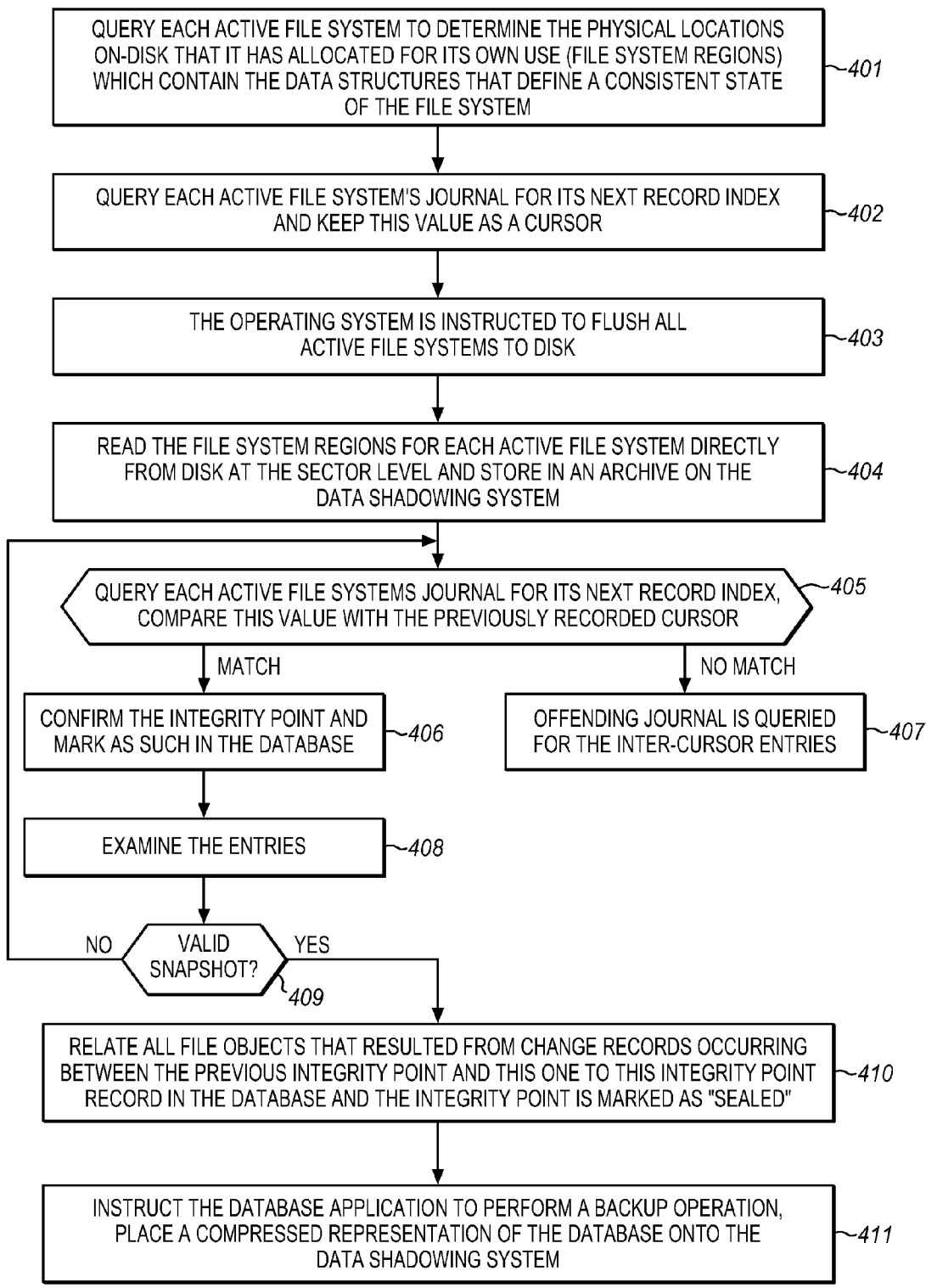
FIG. 4 illustrates, in flowchart form, the operation of the Data Shadowing System to create and store an integrity point to benchmark changes in the monitored computer system's memory.

FIG. 4 illustrates, in flowchart form, the operation of the present Data Shadowing System 100 to create and store an Integrity Point to benchmark changes in the monitored computer system's memory 113.

This is the operation required to store the information necessary to execute a Disk Recovery for a point-in-time. The process of creating an Integrity Point requires reading and storing a self-consistent "snapshot" of the metadata files maintained on-disk by the active file systems. This requires monitoring these file systems for changes occurring while the snapshot is created and deciding if they invalidate the snapshot, requiring another attempt. Exemplary operations include the following steps.

Before attempting to create an Integrity Point, Journal Processing and Data Synchronization must be up-to-date. Each active file system is queried (or directly parsed) by the control software component 103 at step 401 to determine the physical locations on-disk that it has allocated for its own use (File System Regions). These File System Regions contain the data structures that define a consistent state of the file system and must be self-consistent. The control software component 103 then queries each active file system's journal at step 402 for its next record index, and this value is kept as a cursor. The control software component 103 instructs the operating system to flush all active file systems to memory 102 at step 403, and the File System Regions for each active file system are read directly from disk 113 at the sector level and stored in an archive on the Data Shadowing System 100 at step 404.

The control software component 103 again queries each active file system's journal at step 405 for its next record index, and this value is compared with the previously recorded cursor. If the cursors match, then at step 406 the Integrity Point is "confirmed" and marked as such in the database 114. If the cursors do not match, the offending journal is queried for the inter-cursor entries at step 407. The entries are examined by the control software component 103 at step 408, and a decision is made whether or not they invalidate the snapshot. If so, the process is repeated from step 401 until a valid snapshot is achieved. If the snapshot is valid, then at step 410 all file objects that resulted from change records occurring between the previous Integrity Point and this one are related to this Integrity Point record in the database 114, and the Integrity Point is marked as "sealed." The database application is instructed at step 411 to perform a backup operation, resulting in the placement of a compressed representation of the database 114 onto the memory module 101 of the Data Shadowing System 100.

File Version Retrieval

FIG. 5 illustrates, in flow diagram form, the operation of the present Data Shadowing System 100 to retrieve data stored therein for restoration of a file in the memory 113 of the monitored computer system 110. This is the operation to "reconstitute" the contents of a file at a point-in-time. This file-version may reside in the baseline disk image stored to the Data Shadowing System 100 during initialization or in a file-version archive on the Data Shadowing System 100.

The database 114 contains records of each file that has been stored on the Data Shadowing System 100, including the files captured during initialization. Over the course of time, data which enables the restoration of multiple versions of a given file may be stored on the Data Shadowing System 100, creating the ability to retrieve a version of a file from one of several points-in-time. When a file is modified on the monitored computer system 110, the new data is hashed, named, and stored on the monitored computer system 110; and the old version of the file is removed and replaced with only a description of its binary differences to the new version (Reverse X-Delta). This strategy allows for Data Shadowing System 100 to keep pristine copies of all current files, while being able to regenerate previous versions at all times and minimizing data storage space requirements on the Data Shadowing System 100 itself.

The process of retrieving a file from the database and related location of the Data Shadowing System 100 begins at step 501 where the customer opens a customer interface and navigates through the hierarchical file and folder system to locate the desired file or folder. The customer selects the desired file or folder at step 502 and uses "drag-and-drop" functionality to move the selected file or folder to another folder location (e.g., 'Desktop' or 'My Documents') on the monitored computer system. Upon releasing the mouse button, the operating system at step 503 generates a request from the Data Shadowing System 100 for data related to the source file identified by the customer interface. The database then is queried at step 504 to locate the present version of the selected file and its binary differences to the new version, traced back to the point-in-time selected by the customer.

If the customer selects a present version of the file, at step 505 the Data Shadowing System 100 retrieves the pristine copy of the current file and delivers the file to the customer. Otherwise, the Data Shadowing System 100, at step 506, uses the collection of binary differences to trace the selected file backwards in time to recreate the selected version of the file as indicated by the customer, and then delivers the reconstructed file to the customer. The customer reads and seeks on the data stream interface at step 507 and processes the contents as desired.

Summary

The Computer Image Replication System automatically replicates a customer's computer system image, including all of the customer's data, programs, device drivers, program preferences, personalizations, and file directory structures on a new computer system.

What is claimed as new and desired to be protected by Letters Patent of the United States is:

1. A Computer Image Replication System for the automatic migration of the contents of the memory of a customer's old computer system to a memory of a new computer system, comprising:

data shadow copy memory module, located external to and connectable to a customer's old computer system, for storing a shadow copy of the data which is written in the memory of the customer's old computer system;

customer data file manager, resident in the customer's old computer system, for autonomously transmitting customer data files, which comprise non-NTFS files resident on the customer's old computer system, to the data shadow copy module, comprising:

customer data file map generator for autonomously mapping file directory structures associated with each of the customer data files into file tree information which identifies original names and a location of each customer data file that is stored in the memory of the customer's old computer system, as well as a corresponding location in said data shadow copy memory module which stores a copy of these customer data files to enable both memory-level and file-level restoration of data;

old computer system memory image replication system for automatically reconstituting the customer's old computer system memory image on the memory of said new computer system, comprising:

program control means, connected to the new computer system and responsive to data indicative of a plurality of programs purchased by a the customer for installation on a the new computer system, for automatically installing the plurality of programs into a memory in the new computer system and program identification and location data into a registry in the new computer system;

program transfer means for automatically replicating an image copy of programs stored in the memory of the customer's old computer system to the memory of the new computer system and program identification and location data into the registry in the new computer system; and customer file transfer means, connected to the data shadow copy memory module, for replicating an image copy of customer data written in the data shadow copy memory module corresponding to customer data written in the memory of the customer's old computer system and file directory structures of the customer data to the memory of the new computer system.

2. The Computer Image Replication System of claim 1 wherein said program transfer means comprises:

program comparison means for comparing an identity of each of said programs stored in the memory of said customer's old computer system with said plurality of programs purchased by said customer; and program excising means, responsive to an identity of one of said programs stored in the memory of said customer's old computer system matching an identity of one of said plurality of programs purchased by said customer, for failing to automatically write said matched program to said memory in said new computer system.

3. The Computer Image Replication System of claim 1 wherein said program transfer means comprises:

program update means, responsive to availability of an update for one of said programs stored in the memory of said customer's old computer system, for writing an updated version of said one of said programs stored in the memory of said customer's old computer system to said memory in said new computer system.

4. The Computer Image Replication System of claim 1, further comprising:

program memory means for storing a copy of programs, and their associated hash values, that are available from said Computer Image Replication system;

wherein said program transfer means comprises:

program hash means for generating an associated hash value of each of said programs stored in the memory of said customer's old computer system, hash comparison means for comparing each said generated program hash value with hash values of said programs stored in said program memory means, and program load means for automatically loading programs stored in said program memory to said memory of said new computer system and associated program identification and location data into said registry in said new computer system, when a said generated program hash value matches a hash value of one of said programs stored in said program memory means.

5. The Computer Image Replication System of claim 1 wherein said customer file transfer means comprises:

memory module means, connected to said customer's old computer system, for storing a shadow copy of the data which is written in the memory of said customer's old computer system.

6. The Computer Image Replication System of claim 1 wherein said customer file transfer means comprises:

encryption means for encrypting said customer files prior to transmission from said customer's old computer system.

7. The Computer Image Replication System of claim 1 wherein said customer file transfer means comprises:

customer data file management means for autonomously storing customer data files on said memory module means, comprising:

customer data file mapping means for autonomously mapping file directory structures associated with the customer data written in the memory of the monitored computer system into file tree information which identifies original names of customer data files as stored on said monitored computer system, and a location in said memory module means which stores said customer data, and mapping database means for storing said file tree information in a database in said monitored computer system.

8. The Computer Image Replication System of claim 7 wherein said customer data file management means further comprises:

change journal means for automatically tracking changes to said customer data files, including:

customer data file creation, customer data file movement, customer data file content changes, and customer data file renaming.

9. The Computer Image Replication System of claim 8 wherein said customer data file management means further comprises:

file history means, responsive to a modification of a customer data file, for generating file change data indicative of a difference between said customer data file and said modified customer data file; and wherein said customer data file storage means stores said file change data in said memory module means and substitutes said modified customer data file for said customer data file in said memory module means.

10. The Computer Image Replication System of claim 7 wherein said customer data file management means further comprises:

data compression means for compressing said customer data file prior to storage in said memory module means.

11. The Computer Image Replication System of claim 7 wherein said customer data file management means further comprises:

metadata means for indexing the active customer data file systems to extract relevant metadata for every file object in the file system; and database means for recording said metadata in a database.

12. The Computer Image Replication System of claim 7 wherein said customer data file management means further comprises:

file system snapshot means for indexing all active customer data files at a selected point in time; and snapshot storage means for storing said indexing in memory as an Integrity Point representative of a present content of all said customer data files.

13. A method for the automatic migration of the contents of the memory of a customer's old computer system to a memory of a new computer system, comprising:

storing in a data shadow copy module, located external to and connectable to a customer's old computer system, a shadow copy of the data which is written in the memory of the customer's old computer system;

autonomously transmitting from a customer data file manager which is resident in the customer's old computer system, customer data files, which comprise non-NTFS files resident on the customer's old computer system, to the data shadow copy module, comprising:

autonomously mapping file directory structures associated with each of the customer data files into file tree information which identifies original names and a location of each customer data file that is stored in the memory of the customer's old computer system, as well as a corresponding location in said data shadow copy module which stores a copy of these customer data files to enable both memory-level and file-level restoration of data;

automatically installing, in response to data indicative of a plurality of programs purchased by a customer for installation on a new computer system, the plurality of programs into a memory in the new computer system and program identification and location data into a registry in the new computer system;

replicating an image copy of programs stored in the memory of the customer's old computer system to the memory of the new computer system and program identification and location data into the registry in the new computer system;

replicating an image copy of customer data written in the data shadow copy module corresponding to customer data written in the memory of the customer's old computer system and file directory structures of the customer data to the memory of said new computer system.

14. The method for the automatic migration of the contents of the memory of a customer's old computer system to a memory of a new computer system of claim 13 wherein said step of automatically migrating programs comprises:

comparing an identity of each of said programs stored in the memory of said customer's old computer system with said plurality of programs purchased by said customer; and failing, in response to an identity of one of said programs stored in the memory of said customer's old computer system matching an identity of one of said plurality of programs purchased by said customer, to automatically write said matched program to said memory in said new computer system.

15. The method for the automatic migration of the contents of the memory of a customer's old computer system to a memory of a new computer system of claim 13 wherein said step of automatically migrating programs comprises:

writing, in response to availability of an update for one of said programs stored in the memory of said customer's old computer system, an updated version of said one of said programs stored in the memory of said customer's old computer system to said memory in said new computer system.

16. The method for the automatic migration of the contents of the memory of a customer's old computer system to a memory of a new computer system of claim 13, further comprising:

storing a copy of programs, and their associated hash values, that are available from said Computer Image Replication system in a program memory;

wherein said step of automatically migrating programs comprises:

generating an associated hash value of each of said programs stored in the memory of said customer's old computer system, comparing each said generated program hash value with hash values of said programs stored in said program memory means, and automatically loading programs stored in said program memory to said memory of said new computer system and associated program identification and location data into said registry in said new computer system, when a said generated program hash value matches a hash value of one of said programs stored in said program memory.

17. A method for the automatic migration of the contents of the memory of a customer's old computer system to a memory of a new computer system, comprising:

storing in a data shadow copy memory module, located external to and connectable to a customer's old computer system, a shadow copy of the data which is written in the memory of the customer's old computer system;

autonomously transmitting from a customer data file manager which is resident in the customer's old computer system, customer data files, which comprise non-NTFS files resident on the customer's old computer system, to the data shadow copy memory module, comprising:

autonomously mapping file directory structures associated with each of the customer data files into file tree information which identifies original names and a location of each customer data file that is stored in the memory of the customer's old computer system, as well as a corresponding location in said data shadow copy memory module which stores a copy of these customer data files to enable both memory-level and file-level restoration of data;

automatically reconstituting the customer's old computer system memory image on the memory of said new computer system, comprising:

automatically installing, in response to data indicative of a plurality of programs purchased by a customer for installation on a new computer system, the plurality of programs into a memory in the new computer system and program identification and location data into a registry in the new computer system;

replicating an image copy of programs stored in the memory of the customer's old computer system to the memory of the new computer system and program identification and location data into the registry in the new computer system;

replicating an image copy of customer data written in the data shadow copy memory module corresponding to customer data written in the memory of the customer's old computer system and file directory structures of the customer data to the memory of said new computer system.

18. The method for the automatic migration of the contents of the memory of a customer's old computer system to a memory of a new computer system of claim 13 wherein said step of migrating customer data comprises:

encrypting said customer files prior to transmission from said customer's old computer system.

19. The method for the automatic migration of the contents of the memory of a customer's old computer system to a memory of a new computer system of claim 13 wherein said step of migrating customer data comprises:

autonomously storing customer data files on said memory module means, comprising:

autonomously mapping file directory structures associated with the customer data written in the memory of the monitored computer system into file tree information which identifies original names of customer data files as stored on said monitored computer system, and a location in said memory module means which stores said customer data, and storing said file tree information in a database in said monitored computer system.

20. The method for the automatic migration of the contents of the memory of a customer's old computer system to a memory of a new computer system of claim 19 wherein said step of migrating customer data further comprises:

automatically tracking changes to said customer data files, including: customer data file creation, customer data file movement, customer data file content changes, and customer data file renaming.

21. The method for the automatic migration of the contents of the memory of a customer's old computer system to a memory of a new computer system of claim 20 wherein said step of migrating customer data further comprises:

generating, in response to a modification of a customer data file, file change data indicative of a difference between said customer data file and said modified customer data file; and wherein said step of automatically tracking changes stores said file change data in said memory module and substitutes said modified customer data file for said customer data file in said memory module.

22. The method for the automatic migration of the contents of the memory of a customer's old computer system to a memory of a new computer system of claim 19 wherein said step of migrating customer data further comprises:

compressing said customer data file prior to storage in said memory module.

23. The method for the automatic migration of the contents of the memory of a customer's old computer system to a memory of a new computer system of claim 19 wherein said step of migrating customer data further comprises:

indexing the active customer data file systems to extract relevant metadata for every file object in the file system; and recording said metadata in a database.

24. The method for the automatic migration of the contents of the memory of a customer's old computer system to a memory of a new computer system of claim 19 wherein said step of migrating customer data further comprises:

indexing all active customer data files at a selected point in time; and storing said indexing in memory as an Integrity Point representative of a present content of all said customer data files.

\* \* \* \* \*